United States Patent [19]
Campbell et al.

[11] 3,881,900
[45] May 6, 1975

[54] GAS LIQUID SEPARATOR

[75] Inventors: Douglas B. Campbell, Deep River; Edward A. Reeves, Downsview, Ontario, both of Canada

[73] Assignee: Atomic Energy of Canada Limited, Ottawa, Canada

[22] Filed: Oct. 6, 1972

[21] Appl. No.: 295,603

[30] Foreign Application Priority Data
Oct. 6, 1971 Canada .......................... 124538

[52] U.S. Cl. .............. 55/416; 55/419; 55/458; 55/DIG. 23
[51] Int. Cl. .......................................... B01d 45/16
[58] Field of Search ........... 55/315, 318, 413, 414, 55/416, 419, 445, DIG. 14, DIG. 23, 22, 440, 459, 190, 191, 192, 193, 202, 203, 447, 458; 122/34, 488

[56] References Cited
UNITED STATES PATENTS

| | | | |
|---|---|---|---|
| 481,518 | 8/1892 | Woodbridge | 55/DIG. 23 |
| 530,023 | 11/1894 | De Rycke | 55/DIG. 23 |
| 684,299 | 10/1901 | Olsen | 55/DIG. 23 |
| 745,939 | 12/1903 | Warden | 55/DIG. 23 |
| 1,007,289 | 10/1911 | Jeffreys | 55/440 |
| 1,754,126 | 4/1930 | Stievenart | 55/238 |
| 3,076,480 | 2/1963 | Vicardo | 55/459 |
| 3,605,388 | 9/1971 | Zuiderweg et al. | 55/257 |

*Primary Examiner*—Frank W. Lutter
*Assistant Examiner*—David L. Lacey
*Attorney, Agent, or Firm*—Ronald G. Bitner

[57] ABSTRACT

The invention provides a separator for separating a vertical flowing gas-liquid mixture. The separator comprises a vertically elongated cylindrical chamber into which the mixture is introduced vertically. Connected to the inlet conduit within the chamber are a pair of flow diverters which change the flow pattern from a vertical cylindrical configuration to a pair of sheets directed horizontally against the inner walls and circumferentially around the vertical axis of the chamber. The diverters present a continuous geometry to the flow in order to reduce head losses. Inside each diverter are a number of guide vanes distributing the flow evenly through the diverters. The separated gas exits through an outlet at the top of the chamber while the liquid exits at the bottom.

5 Claims, 5 Drawing Figures

GAS LIQUID SEPARATOR

This invention relates to a gas-liquid separator and more particularly to a compact separator for vertical mixture flows.

Two basic types of separators are presently in use.

The first type is known as a hydrocyclone or hydraulic cone. The gas-liquid mixture is directed tangentially onto the inner wall surface of a cylinder, causing the mixture to spiral around and down. The gas is displaced from the liquid and forms a central gaseous core known as a vortex. The gas in the vortex moves up and out of the separator, usually through an outlet in the top of the core, while the liquid spirals out the bottom.

The second type of separator is the radial vane separator. The gas-liquid mixture enters vertically upward through a plenum conduit into the center of the separator. The mixture leaves the plenum through nozzles comprising of vertical slots in the plenum wall. The mixture is deflected outward by a flow deflector onto a series of circular vanes which in turn direct the mixture tangentially onto the chamber wall. Separation occurs as the mixture spirals around the vanes and onto the wall. The gas rises and exits at the top while the liquid spirals to the bottom.

An inherent design problem of the radial vane separator is the high turbulence head loss due to extensive discontinuities in the flow stream lines. Also, the gaseous phase is not easily deflected horizontally through the nozzles resulting in a high degree of water being carried over.

The present invention is a modified radial vane separator. The modification involves combining the flow deflector, the nozzle and the radial vanes into one continuous geometry unit, the flow diverter. The flow diverter is able to reduce considerably the high turbulent head loss and efficiently effect separation.

It is an object of the invention to provide a separator for separating a vertical flowing gas-liquid mixture effectively and doing so with a separator occupying relatively little space in the horizontal plane.

The invention is a gas-liquid separator comprising an elongated substantially vertically disposed cylindrical chamber having an upper gas outlet and a lower liquid outlet, an inlet conduit for directing a gas-liquid mixture upwardly into the chamber, at least one flow diverter disposed within the chamber, each of the diverters having a inlet connected with the inlet conduit, a curvilinear transitional portion for smoothly altering the flow path of the mixture from an upward direction to a direction against the inner walls of the chamber and around a substantially vertical axis, each of the diverters terminating with an upwardly elongated outlet, a plurality of spaced vanes disposed within each of the diverters for dividing each of the diverters into a plurality of channels.

Preferably the cross sectional area perpendicular to the flow direction of each channel of each flow diverter has a constant value from the inlet to the outlet.

The outlet portion of each diverter preferably has a rectangular cross-section defining four walls, an upper wall, a lower wall, a radially inner wall and a radially outer wall. The radially outer wall, that wall which is nearest the inner surface of the chamber, extends circumferentially and vertically beyond the radially inner, upper and lower walls.

Preferably the guide vanes are obliquely oriented with respect to a horizontal plane for the latter half of their length with the radially outermost edges, those nearest the inner surface of the chamber, being higher than the inner edge.

A liquid carry-over impeder may be disposed within the chamber above the diverter and would comprise a plurality of overlapping circumferentially disposed blades, the blades being inclined such that the circular flow of a gas in the chamber induced by the flow diverters is reversed to that induced by the flow diverters.

In the preferred embodiment, the separator has two flow diverters each having adjacent rectangular inlets which combined form a square section. The mixture inlet conduit has an upper adaptor portion having a square section for connection with the combined pair of rectangular inlets.

The invention will now be described with reference to the drawings in which.

Figure 1:
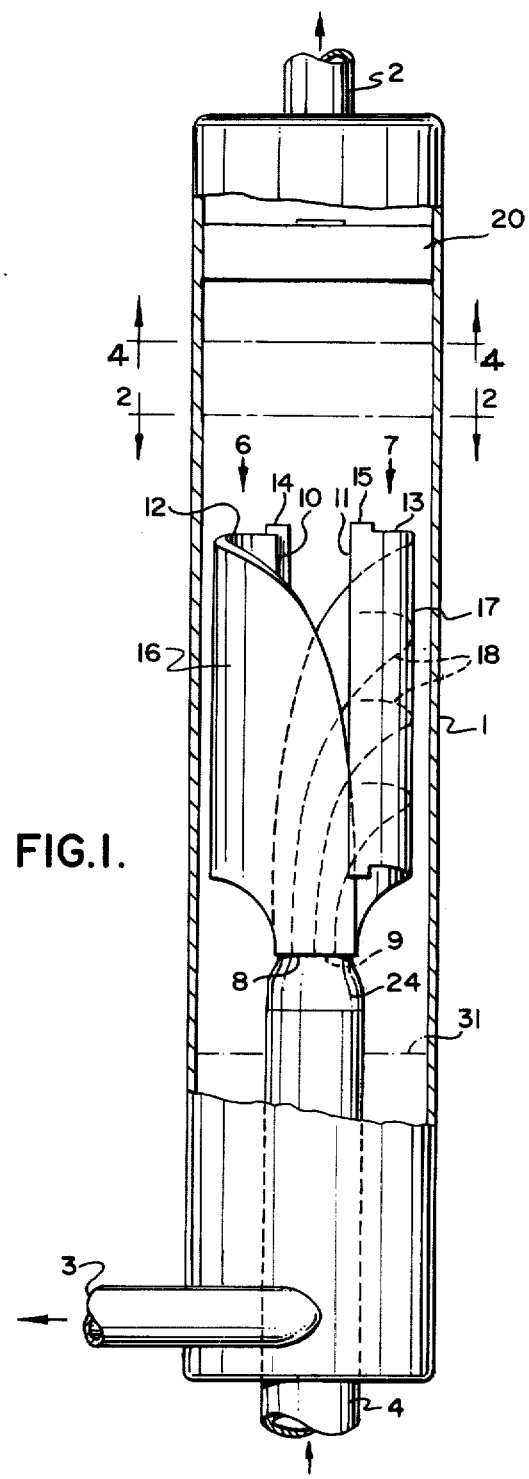
FIG. 1 is a vertical cross-sectional view of one embodiment of the separator.
Figure 2:
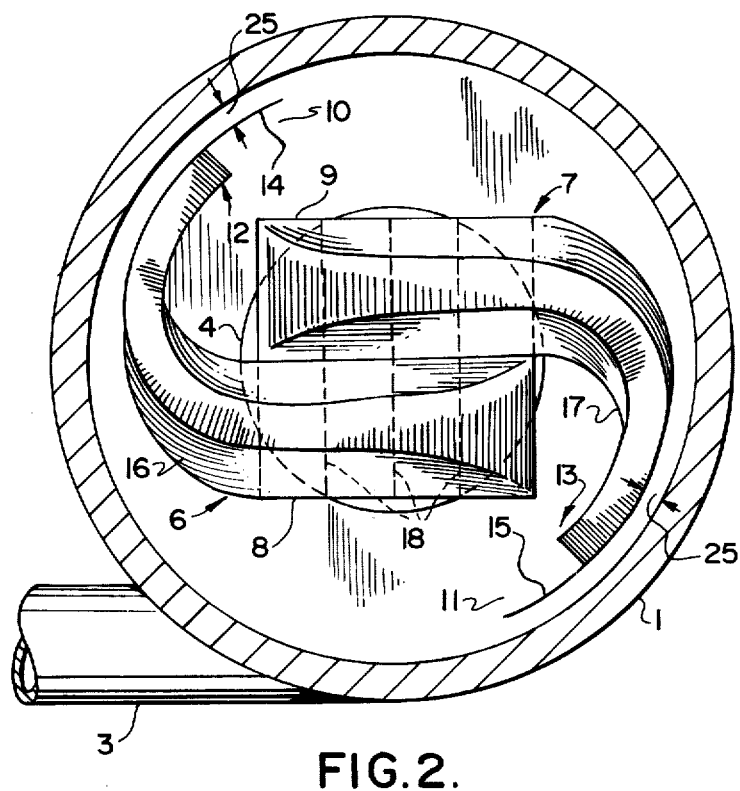
FIG. 2 is a cross-sectional plan view taken at line 2—3 of FIGS. 1.
Figure 3:
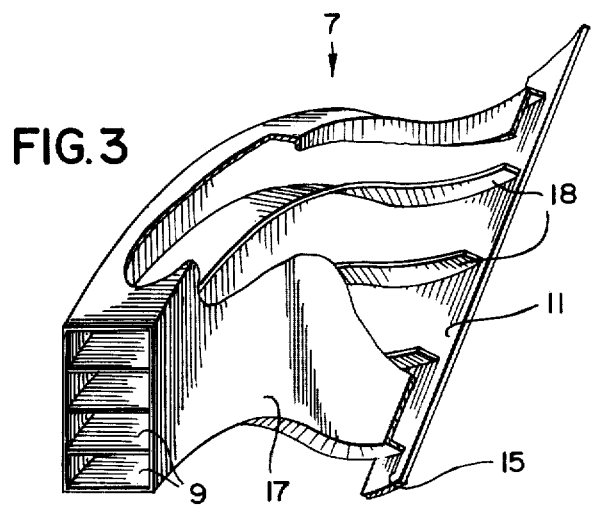
FIG. 3 is a partly fragmented perspective view of one of the diverters shown in FIGS. 1 and 2.

Referring to FIGS. 1, 2 and 3, the separator comprises a cylindrical chamber 1 having an upper gas outlet 2 and a lower liquid outlet 3. A gas-liquid mixture is directed upwardly through an inlet conduit 4 into a pair of flow diverters 6 and 7 disposed within the cylindrical chamber 1. Each flow diverter 6 and 7 has an inlet 8 and 9 respectively, connected to the inlet conduit by means of an intermediate adaptor portion 24. The diverter inlets have rectangular cross-sections which when combined form a square cross-section while the inlet conduit has a circular cross-section of approximately the same area. The adaptor 24 is designed to provide a smooth transition from a circular to square section.

The outlet 10 and 11 of the diverter are directed substantially tangentially against the inner walls of the chamber. The outlets 10 and 11 are greatly elongated in the upward direction, and greatly reduced in width. The transitional portions 16 and 17 of the diverters 6 and 7 are flattened progressively between the inlets 8 and 9 outlets 10 and 11, respectively, providing a continuous geometry and preferably have a minimum change in cross-sectional flow area.

The transitional portions 16 and 17 produce a change of direction of the flow in two planes, i.e., from vertical to horizontal and from radial to circumferential. At the outlets, the mixture is directed against the inner walls around the axis of the cylindrical chamber 1.

Separation begins in the flow diverter and continues in the cylindrical chamber with the heavier liquid being forced to the outside by centrifugal force while the lighter gas remains in the center. Because of the dimensions of the outlet the partially separated liquid on the diverter wall is in the form of a thin layer. This minimizes the distance that entrained gas bubbles have to move through the liquid to achieve separation. The ratio of the outlet length to width should be as large as practical to provide the lowest possible fluid sheet thickness.

With particular reference to FIG. 3, inside each diverter are three spaced guide vanes 18 dividing each diverter into four channels in order to distribute the flow more uniformly through the diverter. Without vanes, flow axial momentum tends to force most of the flow to the top. Also the Coanda effect causes the flow to adhere to the inner wall forming a duct of liquid with the gas at the center. To a lesser extent this also tends to occur when guide vanes 18 are used, however, this tendency can be reduced by inclining the vanes slightly throughout the diverters with the radially outermost edges of the vanes, those nearest the inner surface of the chamber, being higher than the radially innermost edges of the vanes.

Each diverter ends with an end portion 12 or 13 which is horizontal to ensure that the flow exits horizontally. The radially outermost wall of each diverter at the outlet has extentions 14 and 15 that extend circumferentially beyond the vanes, and vertically beyond the top and bottom edges to allow spread of the flow in the vertical direction.

Preferably the ratio of the outlet to inlet cross-sectional area is equal to or greater than one to minimize head losses.

Figure 4:
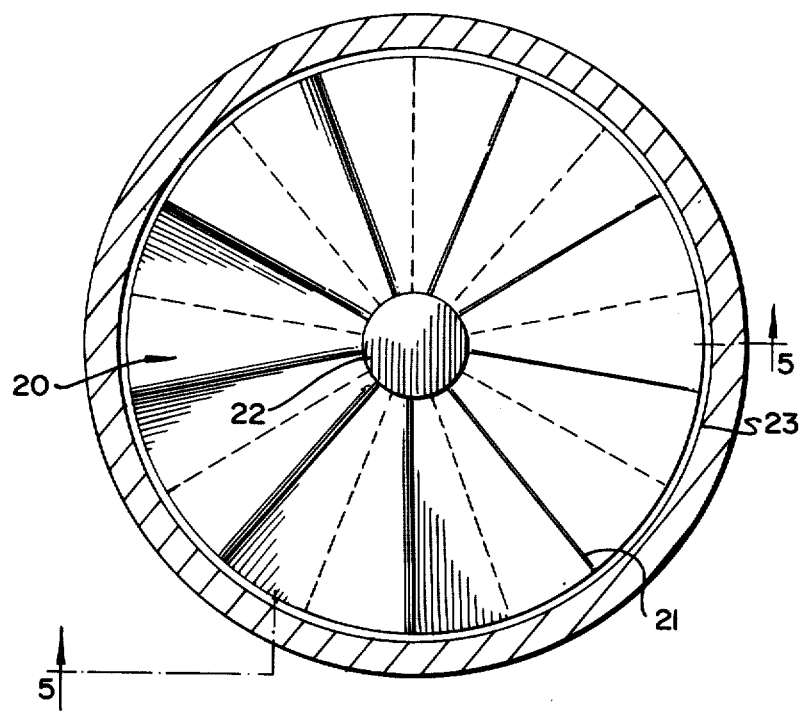
FIG. 4 is a cross-sectional view taken at line 4—4 of FIG. 1 showing the carry-over impeder from the bottom.
Figure 5:
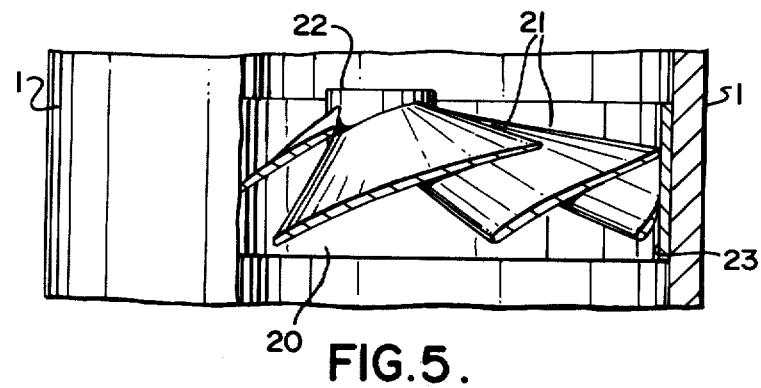
FIG. 5 is a partly sectional view taken at line 5—5 of FIG. 4.

A carry-over impeder 20 is positioned above the diverters to remove water droplets caught in and carried along by the separated gas stream. Referring to FIGS. 4 and 5, the impeder consists of a plurality of overlaying circumferentially disposed blades 21 inclined in a direction to reverse the direction of gas flow. The blades 21 are fixed by attachment to a central hub 22 and an outer ring 23. The blades slope radially downwardly from the central hub to promote drainage of water to the walls of the chamber 1.

The following is a detailed description of a separator developed to provide dry steam for corrosion tests on fuel claddings in a boiling water loop of a nuclear reactor.

The separator was to be mounted directly on top of the reactor so that piping, head and quality losses would be minimized. Two fuel channels were to be located beneath the separator. One boiling water channel was to have supplied the separator.

The construction of the separator presented four main problems: (1) space limitations because of existing header room and fuel channel closure diameter and adjacent fuel channels; (2) penetrability for refuelling; (3) clean drainage required for maintenance by personnel; and (4) high quality of separation required with a minimum of head loss.

The operating temperature was 350°C, the pressure 800 to 1000 psia, the mixture flow rate 0.8 – 1.8 Kg/sec and the mixture quality 10 – 15 percent steam by weight.

The diameter of the cylindrical chamber 1 was 4.5 inches, and the length 30 inches. The diameter of the plenum or inlet conduit 4 was 2 inches. The transitional adaptor 24 was used to change the cross-section from circular to square with 1.80 inch sides. Two diverters 6 and 7 were used each having an inlet section 1.80 × 0.90 inches, and an outlet of 5.50 × 0.25 inches. Preferably, the outlet flow area would be the same as the inlet so that the velocity of the mixture remains constant. The shape of the transitional or the main body of the diverters can be seen in FIGS. 1, 2 and 3, being designed to provide continuous geometry between vertical inlet to horizontal outlet. The radially outer walls extend circumferentially 1.9 inches beyond the vanes and the other walls, and also vertically above and below the upper and lower walls, respectively. To permit vertical spread of the flow.

The gap 25, between the diverters and the inner wall of the chamber 1 should be large enough so that there is a space between the mixture layer and the diverters. This space allows the mixture a further degassing area providing there is no interference from the diverters.

During operation the water level 31 must be maintained above the outlet 3 and below the outlets 10 and 11 of the flow diverters by a suitable level sensor and control valve (not shown).

Although the embodiment shown has two flows diverters, it will be understood that one diverter or a number of diverters could be used depending on the mass flow rate, space limitations, etc. Also the number of vanes used might be varied.

We claim:

1. A gas-liquid separator comprising an elongated substantially vertically disposed cylindrical chamber having an upper gas outlet and a lower liquid outlet, an inlet conduit extending coaxially upwardly into the chamber through a lower wall thereof for directing a gas-liquid mixture upwardly into said chamber, at least one flow diverter disposed within said chamber, each diverter comprising an inlet portion communicating with said inlet conduit, a curvilinear transitional tubular portion curving smoothly radially outwardly from a substantially vertical orientation at the inlet portion and terminating with a horizontally oriented outlet portion that extends circumferentially around a substantially vertically extending axis and wherein said outlet portion is vertically elongated such that the mixture leaves in a sheetlike configuration against an inner surface of the chamber thereby inducing a circular flow of gas in a given direction in said chamber, each diverter having a substantially constant cross-sectional area throughout its length, and a plurality of spaced vanes disposed within and extending substantially throughout the total length of each diverter for dividing said diverter into a plurality of channels, said channels being disposed substantially vertically with respect to one another at said outlet.

2. The apparatus of claim 1 wherein the outlet portion of each diverter has a rectangular crosssection defining an upper wall, a lower wall and a radially inner and radially outer wall with respect to the vertically extending axis, and wherein the radially outer wall extends circumferentially and vertically beyond the inner, upper and lower wall.

3. The apparatus of claim 1 wherein said vanes are obliquely oriented with respect to a horizontal plane with the radially outermost edges of the vanes being higher than the radially innermost edges of the vanes.

4. The apparatus of claim 1 including a liquid carry-over impeder disposed within said chamber above said diverter and comprising a plurality of overlapping circumferentially disposed blades, said blades being inclined such that circular flow of a gas in said chamber is reversed from that induced by the diverter.

5. The apparatus of claim 1 having two flow diverters, each having adjacent rectangular inlet portions which combined form a square section, the mixture inlet conduit having an upper adaptor portion having a square section for connection with the combined pair of rectangular inlet portions.

* * * * *